(12) United States Patent
Kim

(10) Patent No.: US 7,796,616 B2
(45) Date of Patent: Sep. 14, 2010

(54) APPARATUS AND METHOD FOR OFFERING CONNECTIONS BETWEEN NETWORK DEVICES LOCATED IN DIFFERENT HOME NETWORKS

(75) Inventor: Jun-hyeong Kim, Ahnyang (KR)

(73) Assignee: Samsung Electronics Co., Ltd., Suwon (KR)

( * ) Notice: Subject to any disclaimer, the term of this patent is extended or adjusted under 35 U.S.C. 154(b) by 2221 days.

(21) Appl. No.: 10/437,013

(22) Filed: May 14, 2003

(65) Prior Publication Data

US 2003/0214955 A1 Nov. 20, 2003

(30) Foreign Application Priority Data

May 14, 2002 (KR) ................ 2002-26567

(51) Int. Cl.
*H04L 12/56* (2006.01)
(52) U.S. Cl. ........................ 370/401; 370/471
(58) Field of Classification Search ............... 370/230, 370/230.1, 245
See application file for complete search history.

(56) References Cited

U.S. PATENT DOCUMENTS

| 6,128,664 | A * | 10/2000 | Yanagidate et al. | 709/228 |
|---|---|---|---|---|
| 6,526,581 | B1 * | 2/2003 | Edson | 725/74 |
| 7,079,499 | B1 * | 7/2006 | Akhtar et al. | 370/310 |
| 7,356,031 | B1 * | 4/2008 | Toebes et al. | 370/392 |
| 2002/0154635 | A1 * | 10/2002 | Liu | 370/392 |
| 2002/0198840 | A1 * | 12/2002 | Banka et al. | 705/50 |
| 2003/0002496 | A1 * | 1/2003 | Beier | 370/389 |
| 2003/0014541 | A1 * | 1/2003 | Poeluev | 709/245 |
| 2003/0079121 | A1 * | 4/2003 | Gilman et al. | 713/153 |
| 2003/0198235 | A1 * | 10/2003 | Weldon et al. | 370/401 |
| 2004/0148439 | A1 * | 7/2004 | Harvey et al. | 709/249 |

* cited by examiner

*Primary Examiner*—Chirag G Shah
*Assistant Examiner*—Salvador E Rivas
(74) *Attorney, Agent, or Firm*—Sughrue Mion, PLLC

(57) ABSTRACT

A network connection apparatus for communicating between a network device located in a first private network and a second private network located outside the first private network. The apparatus includes an address acquisition module capable of acquiring a public IP address of a network management device from a DNS based on a domain name of the network management device of the second private network is provided. A connection management module is provided that is capable of forming a P2P connection to the network device if there is a request for a connection to the second private network from the network device. The connection management module is further capable of forming a virtual private network tunnel with the second private network based on the public IP address transferred from the address acquisition module. The connection management module is further capable of transferring to the network device a private IP address used in the second private network.

10 Claims, 4 Drawing Sheets

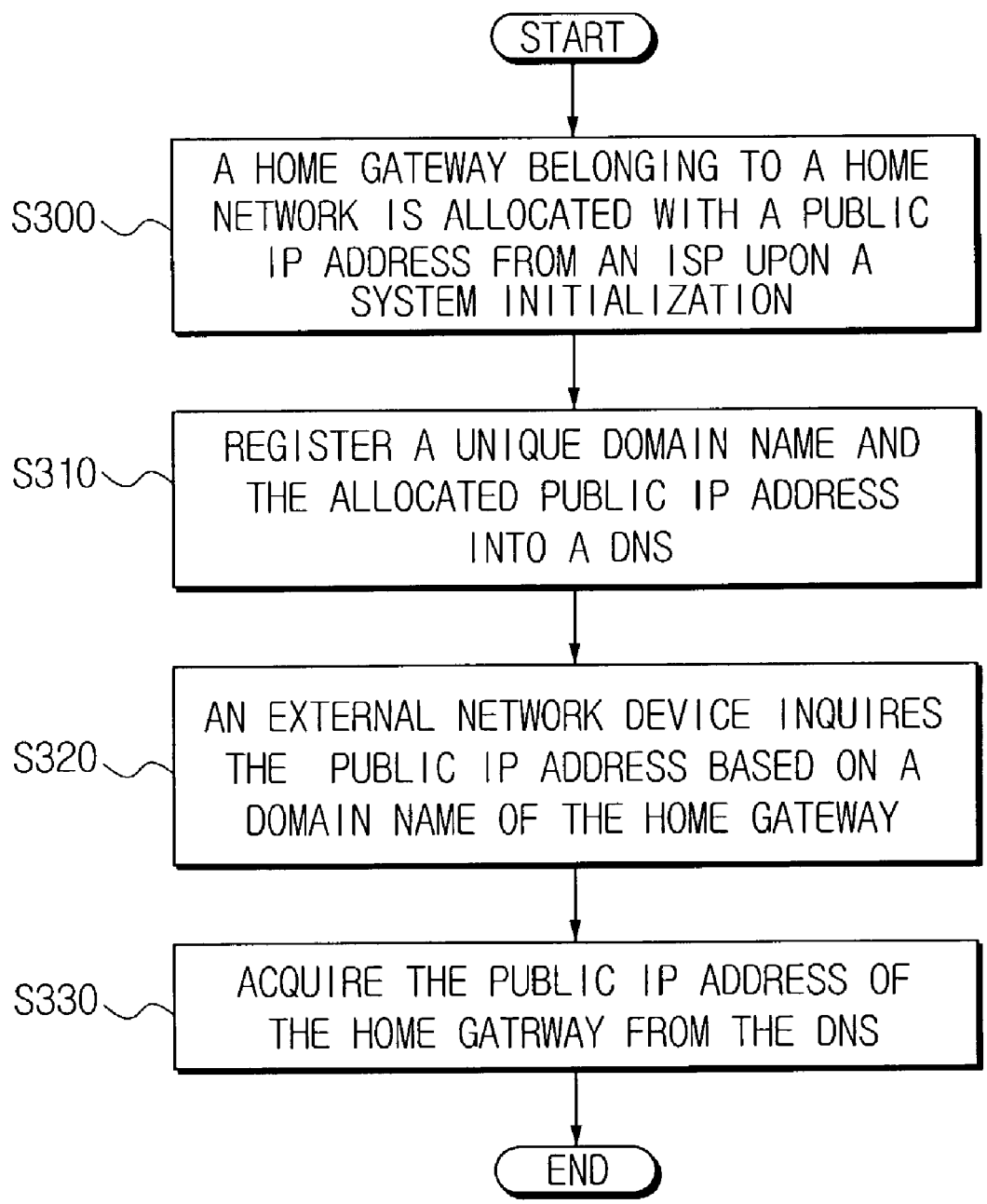

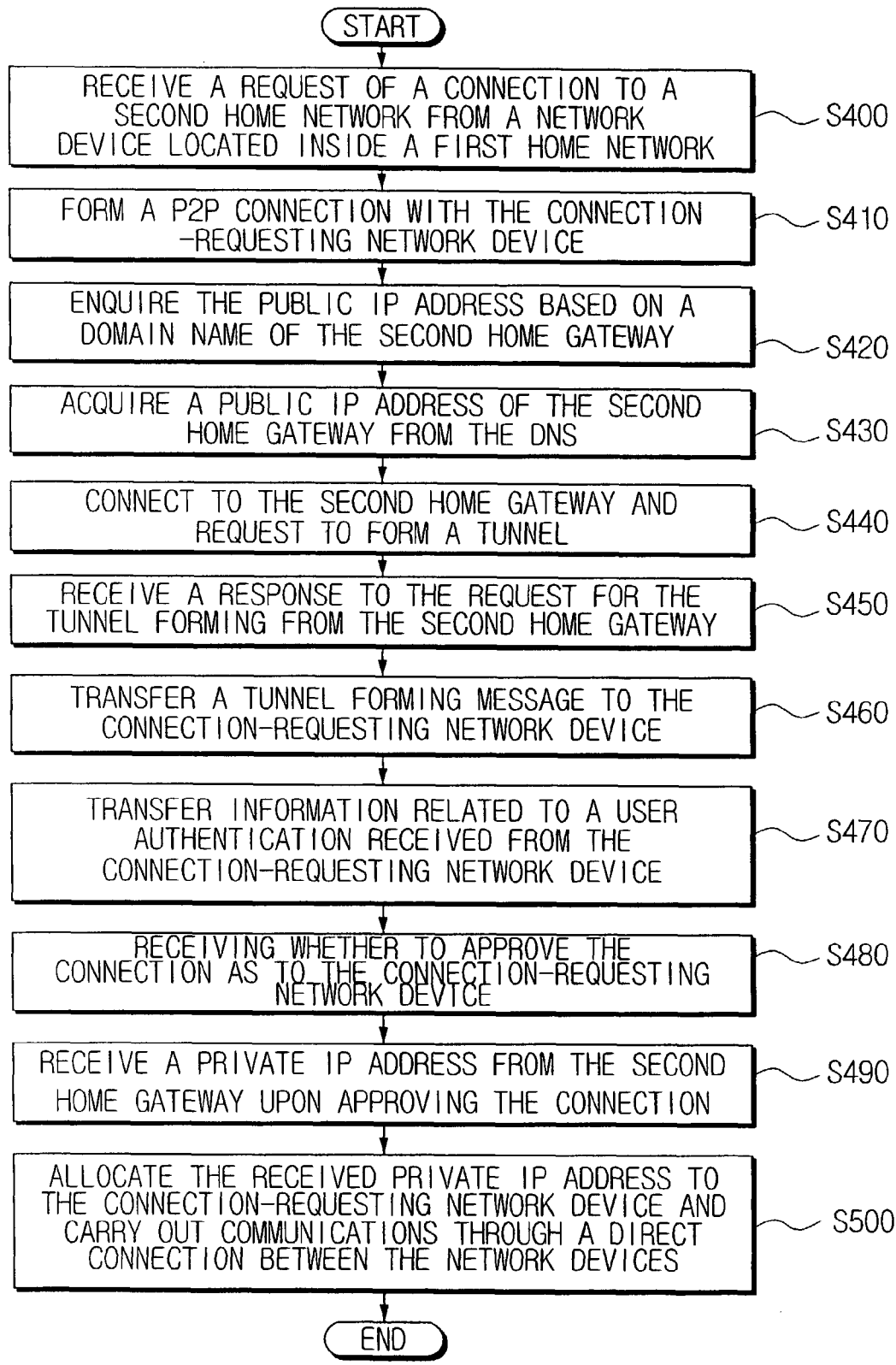

APPARATUS AND METHOD FOR OFFERING CONNECTIONS BETWEEN NETWORK DEVICES LOCATED IN DIFFERENT HOME NETWORKS

This Application claims priority from Korean Patent Application No. 2002-26567, the contents of which are incorporated herein by reference.

BACKGROUND

1. Field

This disclosure generally teaches techniques related to a network connection apparatus and method. Specifically, the teachings relate to a network connection apparatus and method capable of connecting a first network device that forms part of a first arbitrary home network with a second network device that forms part of a second home network.

2. Description of the Related Art

High speed communication networks such as ADSL, cable modem, etc, are currently being used in homes widely. Further variety of home appliances, such as internet refrigerators, digital TVs, set-top boxes, and so on, are available that are capable of connecting to the internet and obtain digital information to assist in their functionality. New home networks or home area networks are emerging that include home appliances with network functions as well as serving as information terminals.

Since electric/electronic products that form part of a home network are connected to the internet using wire or in a wireless manner, a user can receive and transfer information through the internet and control these products regardless of the user's location. To connect and use such products, new network devices and programs are required. A network device which connects to the internet and a home network and controls network packet flows is called a "home gateway". An advantage of a home network is that a variety of services can be provided such as in-house work, SOHO, electronic commerce, home automation and remote control, network games, inter-home network connections, etc.

An internet connection to a home at present is provided using a public internet protocol(IP) address allocated by an internet service provider(ISP). A rudimentary home gateway such as an ADSL, cable modem, etc, are used to make the connection. Such a home gateway does not provide a variety of services but only connects a home network device to the internet. However, more complicated and varieties of functionality are demanded of home networks with the progress in network device used in homes. Examples of such devices are SOHO, in-house work activation, automations, remote controls on home appliances, etc.

In order to accommodate such increased demands, a private IP address is used for a home network. When a private IP address is used, the Network Address Port Translation (NAPT) technology is applied to a home gateway in order for plural network devices to share a public IP address and then access the internet. Further, the virtual private network(VPN) technology is used in a home gateway for a remote user in a home network to connect to the internet. Such technologies used in a home gateway enable a home network to connect to the internet or the internet to connect to a home network. However, such technologies do not provide a connection from an arbitrary home network to another home network. Further, since a public IP address allocated to a home gateway varies every time it is allocated, a user has to know a public IP address allocated to a home gateway at present to connect to a home network hooked up to the internet. If the user is unaware of the current IP address of a home network that he needs to connect to, he can not access the home network.

At present, a user at home connects to an ISP by using a home gateway. The ISP allocates a public IP address to a user that requests a connection. However, since plurality of information devices are used in homes within a home network environment, the network can not simultaneously connect the devices using only one public IP address. Accordingly, the NAPT technology is employed to connect devices to the internet with use of private IP addresses in a home and one public IP address.

When a packet from a home network needs to be sent to the internet, a home gateway translates a private IP address of the packet source and the corresponding source port number into a public IP address and another port number. This information is recorded into an NAPT mapping table. Likewise, when packets that merely respond to the above packets are transferred from the internet to the home network, the home gateway translates a public IP address of packet destination and a destination port number into a private IP address and a port number for routing to the destination. The NAPT mapping table is used for this purpose. Packets transferred to a home network from the internet are discarded if the packets are not recorded in the NAPT mapping table.

Clearly, the NAPT technology enables an access to the internet from a home network. Such an access being such that a request is transferred from a home network to the internet. Likewise, a mere response thereto is transferred back to the home network from the internet. That is, it is possible that plural network devices located in a private network share one public IP address and then make access to the internet. However, an access to a home network from the internet that is not a mere response to an access from the home network in the first place is impossible.

In other words an access to the home network that is initiated fresh from the internet and a response thereto that is transferred to the internet from the home network is not possible. This is because it is not possible to know information related to a home network device. The information that is required for the access include, the private IP address of the home network device and the corresponding port, a port number of the home gateway and the corresponding port number, the public IP address and the corresponding port, IP protocol, and so on. As noted above, such information is recorded in the NAPT mapping table which are necessary for packets sent by an outside user to be translated and routed inside a private network through a home gateway connected to the internet.

VPN is a conventional technology that is used in home gateway that offers a solution to the above problem. Varied VPN technologies exists based on environments and network hierarchy that can be used. However, in relation to home network environments, the PPTP, L2TP, and the like, which use the IP network, a hierarchy is generally employed. A VPN server is located in a home gateway and a remote user connected to the internet operates as a VPN client. First, the VPN client requests the VPN server to generate a tunnel on the internet with use of a public IP address. When the tunnel is generated, the VPN server authenticates the VPN client and allocates a private IP address available in a home network to the VPN client. The VPN client forms a virtual network interface using the allocated private IP address which is connected to the home network and operates as one network. A public IP address of the VPN client is used to generate a tunnel up to the VPN server, and the private IP address is used in the home network connected through the tunnel.

If the NAPT and VPN technologies are used in a home gateway, a plurality of network devices in a home can be connected to the internet from the home network. A remote user using the internet can connect to the home network. However, it is impossible to connect an arbitrary home network with other home networks(Home-to-Home Networking: H2H) at least due to a problem described below.

IP addresses used in a home network are private IP addresses.

Therefore, it is possible that multiple separate home networks using different public IP addresses use the same private IP addresses with the home gateway in each of the home networks operating as the respective VPN servers. This could result in a clash of private IP addresses as discussed below.

If a first network device existing in a first home network requests a connection to a second home network, a tunnel is formed between the first network device and a home gateway of the second home network. The home gateway of the second home network allocates a private IP address used in the second home network to the first network device through the tunnel. The first network device forms a virtual network interface connected to the second home network through the tunnel, and allocates to the interface the private IP address allocated from the second home network.

Accordingly, the first network device is simultaneously allocated with the private IP address used in the first home network to which the first network device belongs and the private IP address used in the second home network. Consequently, the first network device has two private IP addresses belonging to the same network, so it is not clear through which network interface packets should be sent when the packets are intended to be sent. This results in communication failure.

An operating system might prevent creation of a virtual network interface in the case of the above discussed situation.

Further, a home gateway is to be allocated with a public IP address from an ISP in order to be connected to the internet, but the allocated public IP address varies every time the home gateway connects to the ISP, so a user connected to the internet or a different home network should know the public IP address allocated to the current home gateway(VPN server) in order to connect to the home network, and, if the user does not know it, the user can not access a home network be or she wants to connect to. This disclosure is aimed at overcoming some of the disadvantages noted above.

SUMMARY

To overcome the disadvantages noted above, there is provided a network connection apparatus enabling communications between a network device located in a first private network and a second private network located outside the first private network. The apparatus comprises an address acquisition module capable of acquiring a public IP address of a network management device from a DNS based on a domain name of the network management device of the second private network. A connection management module is provided that is capable of forming a P2P connection to the network device if there is a request for a connection to the second private network from the network device. The connection management module is further capable of forming a virtual private network tunnel with the second private network based on the public IP address transferred from the address acquisition module. Since the connection management module is further capable of transferring to the network device a private IP address used in the second private network.

In another specific enhancement, the connection management module further comprises a P2P connection part capable of providing a P2P connection with the network device. A VPN connection part is provided for forming a virtual private network tunnel with the second private network.

Another aspect of the disclosed teachings is a network connection apparatus enabling communications between a private network and a network device located outside the private network, comprising an authentication module capable of authenticating the network device requesting a connection. A connection management module capable of forming a virtual private network tunnel with the network device if a connection authentication signal is received from the authentication module and further capable of allocating a private IP address used inside the private network is included.

In another specific enhancement, a registration request module capable of requesting a registration of a unique domain name of a home gateway through a communication network and a public IP address allocated from an internet service provider is provided.

In another specific enhancement, an encoding module capable of encoding data transferred outside the private network from the network device or decoding the encoded data transferred to the network device from outside the private network is provided.

Yet another aspect of the disclosed teachings is a network connection method enabling communications between a network device located inside a first private network and a second private network located outside the first private network. The method comprises of receiving a request for a connection to the second private network from the network device. A P2P connection is formed with the network device. A virtual private network tunnel is formed between a home gateway to which the network device belongs and the second private network. The network device is notified of the forming of the virtual private network tunnel. An authentication procedure is performed at the second private network regarding the network device and the virtual private network tunnel. An allocated private IP address is transferred to the network device.

In another specific enhancement, the connection as to the network device is authenticated and the connection is carried out if only the connection is authenticated.

Yet another aspect of the disclosed teachings is a network connection method enabling communications between a private network and a network device located outside the private network. The method comprises receiving a request for a connection to the private network from the network device. A virtual private network tunnel is formed with the network device. A private IP address used inside the private network is allocated.

In another specific enhancement, a request is made to a domain name server through a communication network to register a unique domain name and a public IP address allocated from an internet service provider.

In another specific enhancement, authentication is performed with respect to a connection to the network device, and the connection is made only if the connection to the network device is authenticated.

BRIEF DESCRIPTION OF THE DRAWINGS

The above subject and other features of the disclosed teachings will become more apparent by describing in detail example implementations thereof with reference to the attached drawings, and wherein:

FIG. 3 is a flow chart for a network connection method illustrating an example of some aspects of the disclosed teachings; and FIG. 4 is a flow chart for an example network connection method between network devices belonging to different home networks embodying aspects of the disclosed teachings.

DETAILED DESCRIPTION

Figure 1:
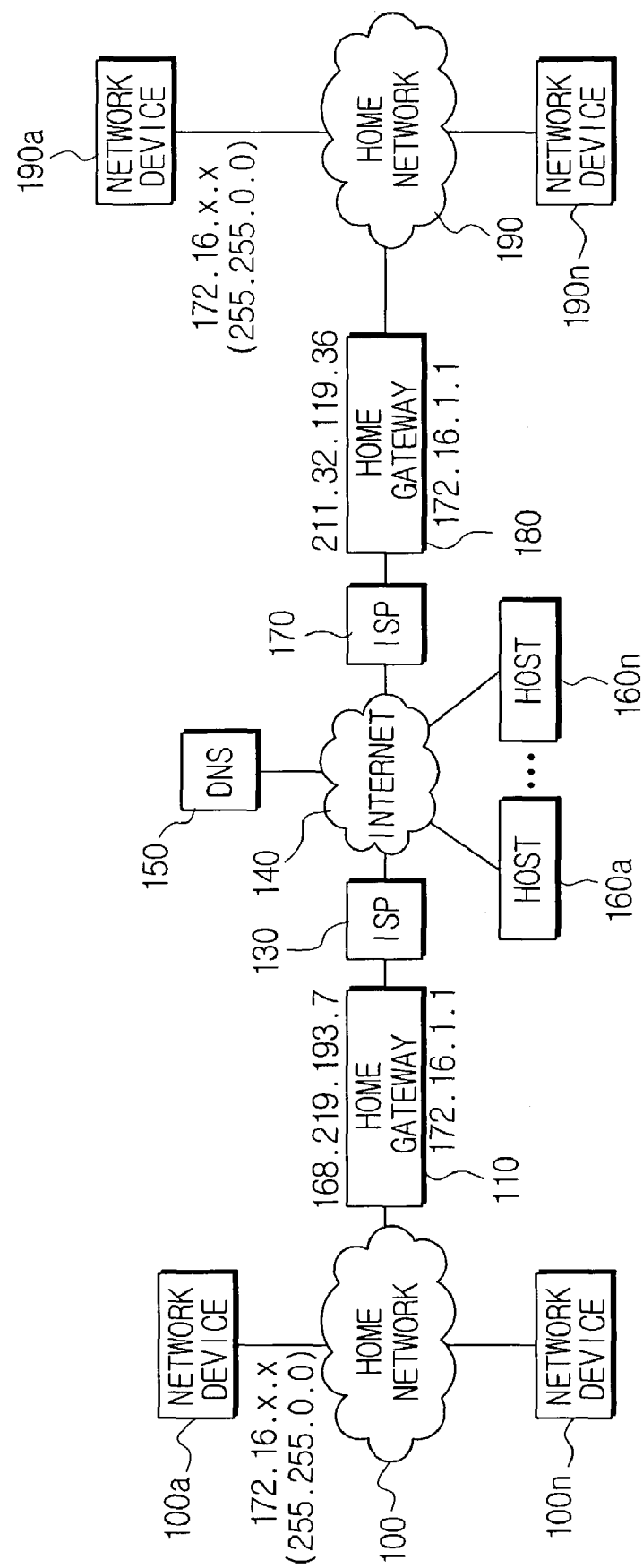
FIG. 1 is a view for showing a structure of an example network configured with home networks each having network connection devices.

FIG. 1 shows a network with multiple home networks 100 and 190. The home networks are connected to the internet 140 through internet service providers 130 and 170. A domain name server 150 is attached to the internet. A plurality of hosts 160a to 160n are further attached to the internet.

The home networks 100 and 190 further include home gateways 110 and 180, respectively. Plurality of network devices 100a to 100n and 190a to 190n, also form part of the home networks, respectively. The home gateways 110 and 180 are devices that connect the internet 140 and the home networks 100 and 190, respectively. The home gateways also control network packets flows. Public IP addresses such as 168.219.193.7 and 211.32.199.136 are used in the internet 140, whereas private IP addresses such as 10.0.0.0~10.255.255.255, 172.16.0.0~172.31.255.255, and 192.168.0.0~192.168.255.255 are employed in the home networks 100 and 190. These home networks are also referred to as the first home network 100 and the second home network 190 in this discussion. The private IP addresses used in the respective home networks 100 and 190 may be identical or different.

The DNS 150 is connected to the internet 140 to process requests for domain name registrations and also receive update from the home gateways 110 and 180. Alternately a plurality of such DNS servers could be used, with at least one processing domain name registration and update requests.

The internet service providers(ISPs) 130 and 170 provides the home gateways 110 and 180 with public IP addresses based on requests from the home gateways 110 and 180.

The network devices 100a to 100n and 190a to 190n existing in the home networks 100 and 190 may use any network interfaces as long as they can receive and transfer IP packets to each other. However, the should operate in peer-to-peer connections if necessary. The network devices 100a to 100n and 190a to 190n could use network interfaces like Ethernet, Home PNA, and the like. The network devices 100a to 100n and 190a to 190n use unique private IP addresses allocated from the home gateways 110 and 180 upon initialization of the network. The home gateways 110 and 180 are set as a gateway and a DNS server.

The home gateways 110 and 180 each have a unique WAN interface and a plurality of LAN interfaces. The plurality of LAN interfaces are connected to the home networks 100 and 190. These LAN interfaces have private IP addresses. The WAN interface, which has a public IP address, is connected to the internet 140 through the ISPs 130 and 170. The home gateways 110 and 180 each operate as a DNS and DHCP server with respect to the home networks 100 and 190. They are each allocated with a public IP address from the ISPs 130 and 170 when the system is initialized. The IP address is registered in the DNS server 150 together with a unique domain name. By doing so, users located outside can find the home gateways 110 and 180 only with the domain names regardless of what the currently allocated public IP address is.

The home gateways 110 and 180 enable the plurality of network devices 100a to 100n and 190a to 190n connected to the home networks 100 and 190 to share a public IP address for connections to the internet 140. Further, the home gateways 110 and 180 enable a user using the internet 140 to connect to the home networks (which are private networks) 100 and 190 by using a virtual private network(VPN). Lastly, the home gateways 110 and 180 connect arbitrary network devices 100a to 100n and 190a to 190n existing in the home networks 100 and 190 to a different home network. Such connections do not mean connecting an entire home network to an entire different home network. It means connecting individual network devices 100a to 100n and 190a to 190n to other home networks.

Figure 2:
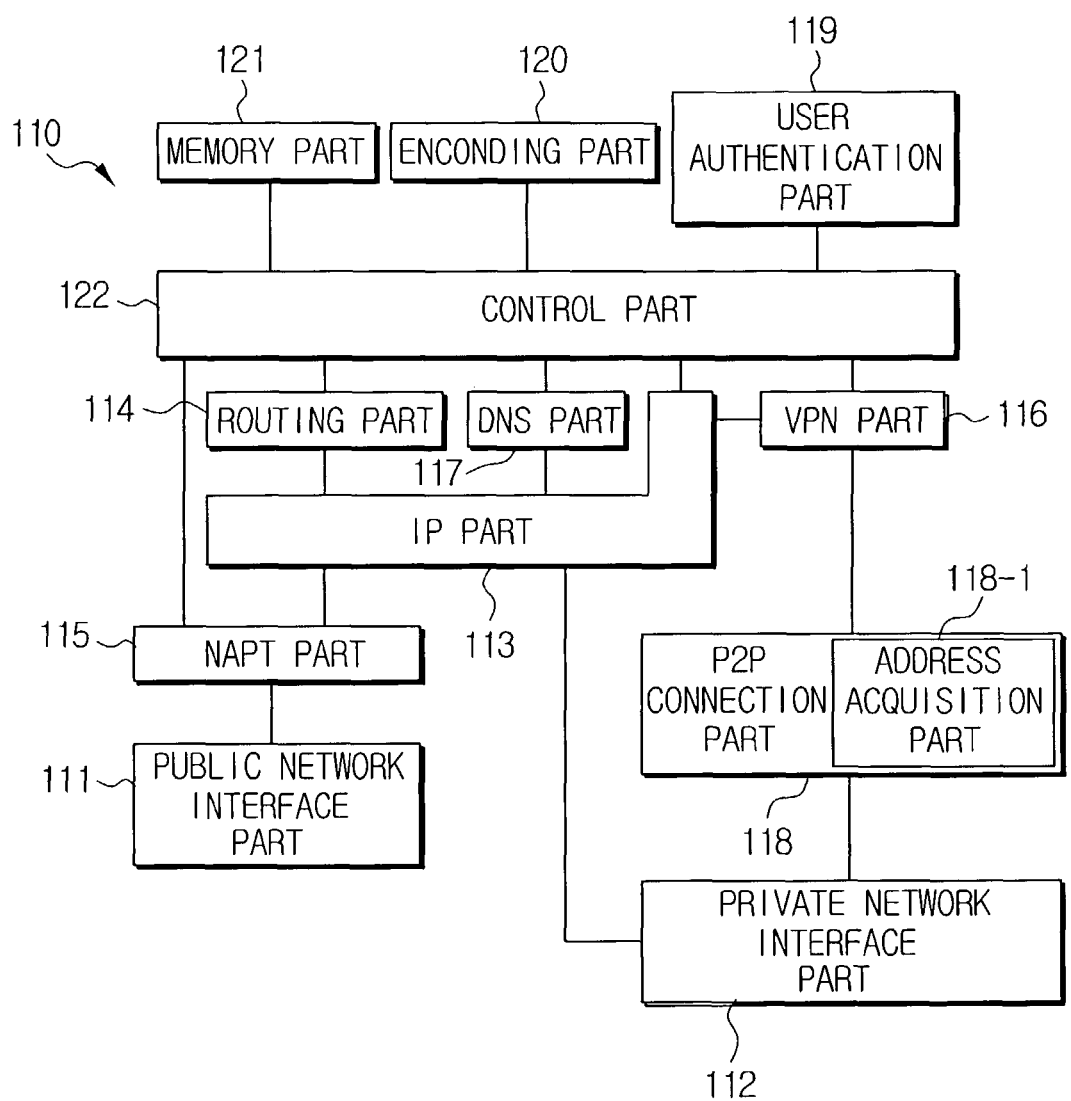
FIG. 2 is a block diagram for showing an internal structure of an example home gateway embodying some aspects of the disclosed teachings.

FIG. 2 is a block diagram for showing an internal structure of an example home gateway embodying the disclosed teachings.

Referring to FIG. 2, the home gateway 110 has a public network interface part 111, a private network interface part 112, an IP part 113, a routing part 114, a network address port translation(NAPT) part 115, a DNS part 117, a peer-to-peer (P2P) connection part 118, a user authentication part 119, an encoding part 120, a memory part 121, and a control part 122.

The public network interface part 111 is connected to the internet 140 through the ISP 130. This provides connections to a broadband access network such as asymmetric digital subscriber line(ADSL), cable modem, and so on.

The private network interface part 112 provides connections to the home network 100. A device interfacing with a LAN network having an IP transfer capacity is used for the connection. If one of the network devices 100a to 100n inside the first home network 100 is connected to the second home network 190, the private interface part 112 is connected to the P2P connection part 118, and, in the other cases, connected to the IP part 113.

The IP part 113 packetizes data according to the IP protocol. These packets are then transferred from inside the home network 100 to outside. The packets could also be received from outside the home network. The routing part 114 transfers received data or to-be-transferred data to an exact destination.

The NAPT part 115 is located between the public network interface part 111 and the IP part 113 and translates a private IP address to a public IP address. The translation is done so that network devices 100a to 100n located in the home network 100 can share one public IP address for connections to the internet 140. Information necessary for the translations is recorded in an NAPT translation table located in the memory part 121. The translation table is updated as required.

The VPN part 116 forms a tunnel to enable the hosts 160a to 160n and the network devices 190a to 190n located in the inside of a private network of the second home network 190 to connect to the first home network 100. Further, the VPN part 116 allocates private IP addresses to the hosts 160a to 160n and the network devices 190a to 190n located in the second home network 190 which are connected through a tunnel. What's more, the VPN part 116 forms a tunnel up to the home gateway 180 of the second home network 190 to enable the network devices 100a to 100n located in the inside of the first home network 100 to connect to the second home network 190.

The DNS part 117 operates as a DNS server for the first home network 100. Further, the DNS part 117 registers a public IP address allocated from the ISP 130 and a unique domain name of the home gateway 110 into the DNS 150 connected to the internet, upon system initialization.

If a connection is requested from one of the network devices 100a to 100n (for example, 100a) located inside the first home network 100 to the second home network 190, the P2P connection part 118 sets a P2P connection between the connection-requesting network device 100a and the home gateway 110. The PPP over Ethernet(PPPoE) may be used for such a P2P connection. The PPPoE is a combination of the PPP usually used in a dial-up connection and the ethernet protocol supporting a plurality of users in a local area communication network. PPP protocol information is capsulized in an ethernet frame. An address acquisition part 118-1 acquires a pubic IP address of network management devices 190a to 190n from a DNS based on a domain name of the network management devices 190a to 190n located inside a private network of another homenetwork 190.

The user authentication part 119 performs an authentication process as regarding request for a connection to one of the hosts 160a to 160n existing outside the first home network 100 or for a connection to one of the network devices 190a to 190n connected to the second home network 190. User information necessary for user authentications is stored in the memory part 121.

The encoding part 120 encodes data in case that security is required with respect to packets transmitted to the internet 140. Further, the encoding part 120 decodes encoded data received through the internet 140. Information necessary for the process of encoding and decoding packets in the encoding part 120 is stored in the memory part 121.

Hereinafter, an example of a network connection method embodying aspects of the disclosed teachings be described in detail with reference to FIG. 3 to FIG. 4. FIG. 3 depicts a flow chart for such an example a network connection method.

Referring to FIG. 3, the home gateway 110 of the first home network is allocated with one public IP address by connecting to the ISP 130 through the public network interface part 111 upon a system initialization(S300). At this time, since the allocated public IP address varies every time, the network devices 190a to 190n outside the first home network 100 or the hosts 160a to 160n that are also outside the first home network should know the public IP address that the first home gateway uses if they intend to approach the home network 100. In order to accomplish this, the home gateway 110 is allocated one unique domain name in the internet 140. This unique domain name and the allocated public IP address is registered with the DNS 150 every time a public IP address is allocated from the ISP 130(S310).

The network devices 190a to 190n intending to connect to the first home network 100 or the hosts 160a to 160n makes inquiries into a public IP address of the home gateway 110 based on the domain name of the home gateway 110(S320). The DNS 150 provides a registered public IP address of the home gateway 110 to the hosts 160a to 160n intending to connect to the home network 100(S330). Through such a process, the hosts 160a to 160n intending to connect to the home network 100 can access the home network 100 regardless of the changes in the public IP address of the home gateway 110 by using the unique domain name of the home gateway 110.

Unlike the above, the network device 100a located inside the first home network 150 should pass through the home gateways 110 and 180 respectively configuring the first and the second networks 100 and 190 in order to access the network device 190a located inside the second home network 190.

FIG. 4 is a flow chart for an example network connection process between network devices belonging to different home networks according to some aspects of the disclosed teachings.

Referring to FIG. 4, the network interface of the network device 100a is initially activated but is not allocated with a private IP address. If the network device 100a located inside the first home network 100 requests a connection to the external network 190a(S400), the home gateway 110 of the first home network 100 to which the connection-requesting network device 100a belongs establishes a P2P connection with the connection-requesting network device 100a(S410). If the P2P connection is established, the connection-requesting network device 100a is allowed to communicate with only the home gateway 110. A response to such a connection-requesting network device 100a and the P2P connection is performed by the P2P connection part 118 provided in the home gateway 110.

The home gateway requests a transfer of the public IP address of the home gateway 180 to the DNS 150 based on a domain name of the home gateway 180 to which the external network device 190a belongs(S420). Since the domain name of the target home gateway 180 is registered in the DNS 150, the home gateway 110 can obtain the public IP address of the target home gateway 180 from the DNS 150(S430).

If the public IP address of the second home gateway 180 is obtained, the first home gateway 110 is connected to the second home gateway 180 and then requests to establish a tunnel(S440). On receiving a response to the request for establishing a tunnel from the second home gateway 180 (S450), the first home gateway 110 sends to the connection-requesting network device 100a a message notifying of the establishment of a tunnel up to the second home gateway 180(S460).

If the tunnel to the second home gateway 180 is formed, the connection-requesting network device 100a transfers to the second home gateway 180 information related to a user authentication(S470). The message sent by the connection-requesting network device 100a is exactly transferred to the second home gateway 180 by the P2P connection between the connection-requesting network device 100a and the first home gateway 110 and the virtual private network connection between the first home gateway 110 and the second home gateway 180.

The second home gateway 180 determines whether to approve a connection of the connection-requesting network 100a based on the received information related to the user authentication(S480). If the connection is approved, the second home gateway 180 allocates to the connection requesting network device 100a a private IP address being used inside the second home network 190(S490).

The private IP address is transferred through the first home gateway 110. The connection-requesting network device 100a can communicate in a direct connection with the network device 190a located inside the second home network 190 by way of the first home gateway 110 and the second home gateway 180(S500).

Since the P2P connection is formed between the connection-requesting network device 100a and the first home gateway 110, the communications can be carried out without any relationship with the other network devices 100b to 100n located in the first home network 100.

It is useful to encode data transferred through a tunnel established between the connection-requesting network device 100a and the target home gateway 180 for security.

As stated above, in case that a network device located inside a first home network using private IP addresses intends to connect to a second home network using private IP addresses, the disclosed teachings include forming a P2P connection between the first network device and a home gateway. Further, a virtual private network tunnel is formed between a first home gateway of the first home network to which the network device belongs and a second home gateway of the second home network to enable communications between different home networks(H2H connection). What's more, if a network device located outside a home network intends to connect to the home network, the disclosed teachings include forming a virtual private network tunnel between the network device and a home gateway of the home network to enables communications between them. Further, the disclosed teachings includes registering into a DNS located in the internet a public IP address of a home gateway which is dynamically allocated from an ISP upon a system initialization. Also, a unique domain name is registered that enables a host located in the internet or a host located in the second home network to connect to a home network with only the unique domain name of the home gateway.

Further a P2P connection is formed between a network device located inside a first home network and a first home gateway, and forms a virtual private network tunnel between the first home gateway and a second home network, to thereby enable communications between different home networks (H2H connection). Further, a public IP address of a home gateway dynamically allocated from an ISP upon a system initialization and a unique domain name are registered with the DNS located in the internet, so that a host located in the internet or a host located in a second home network can connect to a home network with only the unique domain name of the home gateway.

Although the preferred embodiment of the present invention has been described, it will be understood by those skilled in the art that the present invention should not be limited to the described embodiment, but various changes and modifications can be made within the spirit and scope of the present invention as defined by the appended claims.

What is claimed is:

1. A network connection apparatus for communicating between a network device located in a first private network and a second private network located outside the first private network, comprising:
    an address acquisition module residing in a memory acquires a public Internet protocol (IP) address of a network management device from a domain name server (DNS) based on a domain name of the network management device of the second private network; and
    a connection management module residing in a memory forms a peer-to-peer (P2P) connection to the network device if there is a request for a connection to the second private network from the network device,
    wherein the connection management module residing in a memory forms a virtual private network tunnel with the second private network based on the public IP address transferred from the address acquisition module, and
    wherein the connection management module residing in the memory transfers and allocates to the network device in the first private network a private IP address used in the second private network.

2. The network connection apparatus according to claim 1, wherein the connection management module residing in the memory further comprises:
    a P2P connection part that provides a P2P connection with the network device; and
    a virtual private network (VPN) connection part that forms a virtual private network tunnel with the second private network.

3. A network connection apparatus used for communicating between a private network and a network device located outside the private network, comprising:
    an authentication module residing in a memory that authenticates the network device requesting a connection; and
    a connection management module residing in a memory that forms a virtual private network tunnel with the network device if a connection authentication signal is received from the authentication module and further transfers and allocates a private IP address used inside the private network.

4. The network connection apparatus according to claim 3, further comprising a registration request module residing in a memory that requests a registration of a unique domain name of a home gateway through a communication network and a public IP address allocated from an internet service provider.

5. The network connection apparatus according to claim 3, further comprising an encoding module residing in a memory that encodes data transferred outside the private network from the network device or decoding the encoded data transferred to the network device from outside the private network.

6. A network connection method for communicating between a network device located inside a first private network and a second private network located outside the first private network, the method comprising:
    (a) receiving a requesting for a connection to the second private network from the network device;
    (b) forming a P2P connection to the network device;
    (c) forming a virtual private network tunnel between a home gateway to which the network device belongs and the second private network;
    (d) notifying the network device of the forming of the virtual private network tunnel;
    (e) performing an authentication procedure at the second private network regarding the network device and the virtual private network tunnel; and
    (f) transferring and allocating an allocated private IP used in the second network address to the network device in the first private network.

7. The network connection method according to claim 6, wherein the step (c) includes a step of authenticating the connection as to the network device, and the step (d) is carried out only if the connection is authenticated.

8. A network connection method for communicating between a private network and a network device located outside the private network, the method comprising:
    (a) receiving a request for a connection to the private network from the network device; and
    (b) forming a virtual private network tunnel with the network device and transferring allocating a private IP address used inside the private network to the network device.

9. The network connection method according to claim 8, further comprising, prior to step (a), requesting a domain name server through a communication network to register a unique domain name and a public IP address allocated from an internet service provider.

10. The network connection method according to claim 8, wherein the step (a) includes authenticating a connection to the network device, and the step (b) is carried out only if the connection to the network device is authenticated.

* * * * *